US012132773B2

(12) United States Patent
Nehlin et al.

(10) Patent No.: US 12,132,773 B2
(45) Date of Patent: Oct. 29, 2024

(54) GROUP PLAYBACK SESSION MANAGEMENT

(71) Applicant: Spotify AB, Stockholm (SE)

(72) Inventors: Oskar David Nehlin, Stockholm (SE); Daniel Claes Johan Collin, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/342,083

(22) Filed: Jun. 8, 2021

(65) Prior Publication Data
US 2022/0394071 A1    Dec. 8, 2022

(51) Int. Cl.
*H04L 65/611* (2022.01)
*H04L 65/1069* (2022.01)
*H04L 65/403* (2022.01)

(52) U.S. Cl.
CPC ........ *H04L 65/611* (2022.05); *H04L 65/1069* (2013.01); *H04L 65/403* (2013.01)

(58) Field of Classification Search
CPC ............. H04L 65/4076; H04L 65/1069; H04L 65/403
See application file for complete search history.

(56) References Cited

U.S. PATENT DOCUMENTS

| | | | |
|---|---|---|---|
| 9,195,383 B2 | 11/2015 | Garmark et al. | |
| 2009/0222520 A1 | 9/2009 | Sloo et al. | |
| 2009/0249222 A1* | 10/2009 | Schmidt | H04N 21/4143 |
| | | | 713/400 |
| 2010/0202761 A1* | 8/2010 | Bhogal | H04N 21/4788 |
| | | | 386/241 |
| 2014/0003623 A1* | 1/2014 | Lang | H03G 3/3089 |
| | | | 381/98 |
| 2014/0075308 A1 | 3/2014 | Sanders | |
| 2014/0331135 A1 | 11/2014 | Sukoff et al. | |
| 2017/0134831 A1* | 5/2017 | Talukder | H04L 65/4015 |
| 2017/0251040 A1* | 8/2017 | Archambault | H04N 21/43076 |
| 2018/0302761 A1* | 10/2018 | Rizzolo | H04L 51/10 |
| 2019/0124159 A1 | 4/2019 | Alsina et al. | |
| 2019/0304507 A1* | 10/2019 | Leyfman | H04N 21/43637 |
| 2019/0370280 A1* | 12/2019 | Shenoy | G06F 16/4387 |

(Continued)

FOREIGN PATENT DOCUMENTS

| | | |
|---|---|---|
| WO | 2016/160813 | 10/2016 |
| WO | 2017/058442 | 4/2017 |
| WO | 2017/058444 | 4/2017 |

OTHER PUBLICATIONS

Spotify, Your Squad Can Now Stream Simultaneously Using Spotify's Group Session Beta, Jul. 28, 2020, 3 pages.

(Continued)

*Primary Examiner* — Moustafa M Meky
*Assistant Examiner* — Kidest Mendaye
(74) *Attorney, Agent, or Firm* — Morgan, Lewis & Bockius LLP

(57) ABSTRACT

This disclosure is directed to systems and methods for managing a group session for consuming media content across a plurality of devices. In some configurations and by non-limiting example, the group session operates to synchronize playback and control of media content at the plurality of devices. In one aspect a method of simultaneously playing media content on a plurality of media playback devices for a group session is disclosed.

21 Claims, 17 Drawing Sheets

(56) References Cited

U.S. PATENT DOCUMENTS

| | | | |
|---|---|---|---|
| 2020/0252473 A1* | 8/2020 | Kumar | G06F 16/955 |
| 2021/0037267 A1 | 2/2021 | Shore | |
| 2021/0044855 A1* | 2/2021 | de Boursetty | H04N 21/234 |
| 2021/0141589 A1* | 5/2021 | Taylor | H04L 65/4084 |
| 2022/0210502 A1* | 6/2022 | Chan | H04N 21/43615 |
| 2022/0353223 A1 | 11/2022 | Ceccato | |

OTHER PUBLICATIONS

Donato, How do I turn 2 or more Sonos speakers into a group?, Oct. 2, 2020, 9 pages.
Heddings, Lowell, How to Use Apple's New Multi-Room Audio Features in AirPlay 2, May 30, 2018, 9 pages.
European Extended Search Report in Application 22163799, mailed Sep. 23, 2022, 11 pages.

* cited by examiner

GROUP PLAYBACK SESSION MANAGEMENT

BACKGROUND

It is common for a group of people to consume media content together. For example, friends often listen to music as a group while spending time together. There are many media content applications which are used to provide and control media content output. These applications receive commands controlling the media content from a device. Typically, these applications operate with a single device managing the playback of media content. For example, a single device running the media content application will select a current song, make changes to a current song, and update a queue of next songs. In these examples, many events can interrupt to the media content playback. For example, if the device managing the media content is a smart phone an incoming call or loss of battery power will interrupt the playback. Additionally, groups of users may wish to consume media content simultaneously on personal devices when they are in different locations.

SUMMARY

In general terms, this disclosure is directed to systems and methods for managing a group session for consuming media content across a plurality of devices. In some configurations and by non-limiting example, the group session operates to provide synchronize playback and control of media content at the plurality of devices.

One aspect is a method of simultaneously playing media content on a plurality of media playback devices for a group session, the method comprising: storing session state data for the group session at a cloud host server, the session state data including a media content identifier for a media content item of the group session, storing a list of members of the group session at the cloud host server, wherein each member is associated with one of the media playback devices, and, and generating and sending a session state data package including at least some of the session state data from the cloud host server to the media playback devices associated with the members of the group session, wherein the session state data package is usable by the media playback devices to play the media content item of the group session.

Another aspect is a non-transitory computer-readable storage device storing data instructions, which when executed by a processing device, cause the processing device to: store session state data for a group session, the session state data including a media content identifier for a media content item of the group session, store a list of members of the group session, wherein each member is associated with a media playback device, and generate and send a session state data package including at least some of the session state data to each media playback device associated with the members of the group session, wherein the session state data package is usable by the media playback devices to play the media content item of the group session.

BRIEF DESCRIPTION OF THE DRAWINGS

Various embodiments will be described in detail with reference to the drawings, wherein like reference numerals represent like parts and assemblies throughout the several views.

DETAILED DESCRIPTION

Figure 1:
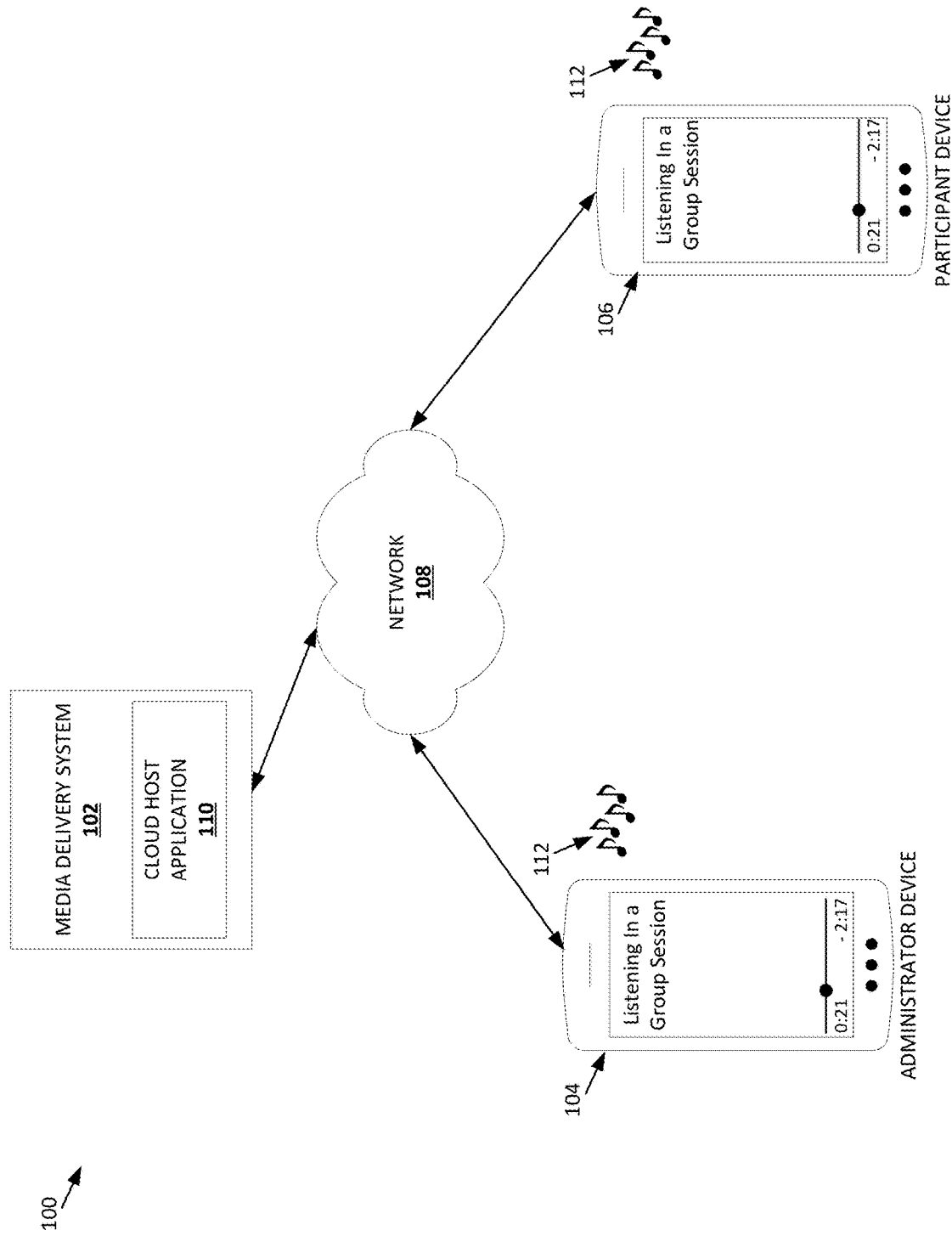
FIG. 1 illustrates an example group playback session system.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

In general terms, the present disclosure is directed to systems and methods for managing a group session for consuming media content across a plurality of devices. In some configurations and by non-limiting example, the group session operates to synchronize playback and control of media content at the plurality of devices. In other configurations and by non-limiting example, the group session operates to synchronize control of media content which is output at a single device or a configured set of devices.

In some embodiments, a group session consists of a list of members and a session state. Each member is associated with a media playback device. Each media playback device is able control the media content by sending commands to update the session state. In some examples, each media playback device outputs the same media content at generally the same time. For example, two users in different locations can listen to the same song at the same time with each media playback device generating the media content output. In other examples, one or more of the media playback devices is able to send commands to update the session state but does not generate media content output. For example, two users in the same room may wish to both control the media content from their personal devices while only one device generates the output. In some embodiments, the member selects whether to generate output when joining the group session.

Many of the examples herein are described in the context of audio content (e.g. songs albums, podcast, etc.). However, the methods and systems described herein operate similarly in the context of other media content (e.g. video content). The scope of this disclosure includes all types of media content.

FIG. 1 illustrates an example group session system 100. The group session system 100 includes a media delivery system 102, an administrator media playback device 104, a participant media playback device 106, and a network 108. The media delivery system 102 operates with a cloud host application 110. The administrator media playback device 104, and the participant media playback device 106 are configured to output a media output 112.

The group session system 100 operates to run a group session with a plurality of media playback devices, wherein each playback device is associated with a user account. The group session system 100 allows the group session to continue when a member media playback device experiences an interruption. For example, if one of the media playback devices receives a phone call and the group session will continue uninterrupted for the other members. The group session system 100 is further configured to not rely on any members media playback device as the group session is hosted by the cloud host application. The group session is also configured to operate with a variety of different members, including small groups and large groups. In these examples, a host or an administrator of the group session may set different levels of access for members so only a set of members are able to control the group session. In some embodiments, the group session supports promoting a member to a host role or adding multiple members to an administrator role.

The group session system 100 includes a media delivery system 102. In the example shown, the media delivery system 102 operates to provide media content to the administrator media playback device 104 and the participant media playback device 106. In some examples, the media delivery system 102 provides the media content items using the network 108. A media content item is an item of media content, including audio, video, or other types of media content which may be stored in any format suitable for storing media content. Non-limiting examples of media content items include songs, albums, music videos movies, television episodes, podcasts, other types of audio or video content, and portions or combinations thereof. An example media delivery system 102 is described in FIG. 2.

The media delivery system 102 operates a cloud host application 110. The cloud host application 110 runs a group listening session. The cloud host application 110 tracks a session state which is propagated to each media playback device in the group session. In some examples, the cloud host application 110 also tracks a list of members which are part of the group session. Examples of the cloud host application are described below.

The administrator media playback device 104 operates to create, join, and participate in a group session. The administrator media playback device 104 can also operate to play media content items and produce media output 112. The administrator media playback device 104 is a computing device with a communication interface that can connect to the network 108. Examples of the administrator media playback device 104 include a computing device, gaming console, mobile computing device, tablet, smartphone, and a smart speaker. In some examples, the administrator media playback device 104 includes some or all of the components of the media playback device 140 illustrated in FIG. 2.

The participant media playback device 106 operates to join and participate in a group session. In some examples, the participant media playback device 106 operates to play media content items and produce media output 112 received from the media delivery system 102. The participant media playback device 106 is typically a computing device with a communication interface which can connect to the network 108. Examples of the participant media playback device 106 include a computing device, gaming counsel, mobile computing device, tablet, smartphone, and a smart speaker. In some examples, the participant media playback device 106 includes some or all of the components of the media playback device 140 illustrated in FIG. 2.

The system 100 includes a network 108. The network 108 connects the media delivery system 102 to the administrator media playback device 104 and the participant media playback device 106. In some examples, the network 108 is a public network, such as the Internet. In example embodiments, the network 108 may connect with media playback devices through a Wi-Fi® network or a cellular network.

Figure 2:
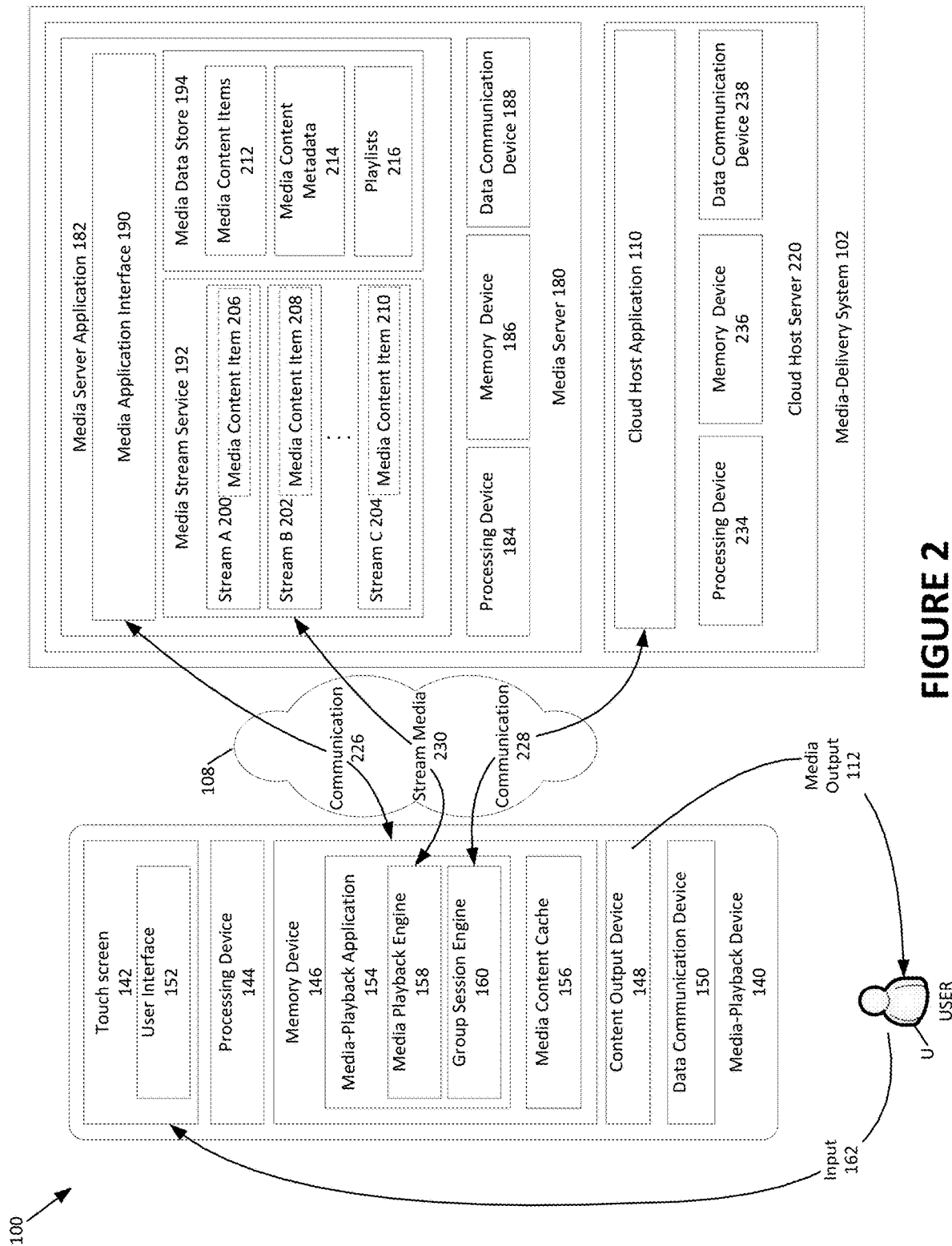
FIG. 2 is a schematic illustration of an example group session system.

FIG. 2 is a schematic illustration of an example group session system 100. The system 100 includes a media playback device 140, which communicates with the media delivery system 102 via the network 108. Also shown is a user U.

The media playback device 140 is an example of the administrator media playback device 104 or the participant media playback device 106, as shown in FIG. 1. The media playback device 140 plays media content items. In some embodiments, the media playback device 140 plays media content items that are provided (e.g., streamed, transmitted, etc.) by a system external to the media playback device 140 such as the media delivery system 102, another system, or a peer device. Alternatively, in some embodiments, the media playback device 140 plays media content items stored locally on the media playback device 140. Further, in at least some embodiments, the media playback device 140 plays media content items that are stored locally as well as media content items provided by other systems.

In some embodiments, the media playback device 140 is a portable computing device. Such a portable computing device includes a handheld entertainment device, smartphone, tablet, watch, wearable device, or any other type of device capable of playing media content. In other embodiments, the media playback device 140 is a laptop computer, desktop computer, smart speaker, or other computing consoles.

In at least some embodiments, the media playback device 140 includes a touch screen 142, a processing device 144, a memory device 146, a content output device 148, and a data communication device 150. Other embodiments may include additional, different, or fewer components.

The touch screen 142 operates to receive an input 162 from a selector (e.g., a finger, stylus etc.) controlled by the user U. In some embodiments, the touch screen 142 operates as both a display device and a user input device. In some embodiments, the touch screen 142 detects inputs based on one or both of touches and near-touches. In some embodiments, the touch screen 142 displays a user interface 152 for interacting with the media playback device 140. As noted above, some embodiments do not include a touch screen 142. Some embodiments include a display device and one or more separate user interface devices. Further, some embodiments do not include a display device.

In some embodiments, the processing device 144 comprises one or more central processing units (CPU). In other embodiments, the processing device 144 additionally or alternatively includes one or more digital signal processors, field-programmable gate arrays, or other electronic circuits.

The memory device 146 typically includes at least some form of computer-readable media. Computer-readable media includes any available media that can be accessed by the media playback device 140. By way of example, computer-readable media include computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read-only memory, electrically erasable programmable read-only memory, flash memory and other memory technology, compact disc read-only memory, Blueray® discs, digital versatile discs or other optical storage, magnetic cassettes, magnetic tape, magnetic disk storage or other magnetic storage devices, or any other medium that can be used to store the desired information and that can be accessed by the media playback device 140. In some embodiments, computer-readable storage media is non-transitory computer-readable storage media.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

The memory device 146 operates to store data and instructions. In some embodiments, the memory device 146 stores instructions for a media playback application 154 and a media content cache 156.

The memory device 146 includes a media playback application 154. In some embodiments, the media playback application 154 comprises a media playback engine 158 and a group session engine 160.

Some embodiments of the media playback application 154 include a media playback engine 158. The media playback engine 158 operates to play media content to the user U. As described herein, the media playback engine 158 is configured to communicate with the media delivery system 102 to receive one or more tracks (for example, through the streaming media channel 230). In other embodiments, the media playback engine 158 is configured to play media content that is locally stored in the media playback device 140.

In some embodiments, the media playback engine 158 operates to retrieve one or more tracks that either locally stored in the media playback device 140 or remotely stored in the media delivery system 102. In some embodiments, the media playback engine 158 is configured to send a request to the media delivery system 102 for tracks and receive information about such tracks for playback.

In some embodiments, the media playback application 154 includes a group session engine 160. The group session engine 160 operates to receive a session state from the cloud host server 220. The group session engine 160 uses the session state to instruct the media playback engine to receive one or more media content items and generate the media output 112 which is synchronized with the group session.

For example, the group session engine 160 may receive a session state which includes a current media content item and a playback time position of the current media content item. The group session engine 160 instructs the media playback engine 158 to retrieve the media content item, from either the media server 180 or the media content cache 156 and start media content item at the time specified in the session state, as determined by the cloud host application. In other embodiments the group session engine 160 may receive a timestamp for the start time of the current media content item. In these embodiments, the group session engine 160 uses this timestamp to determine the current playback time position of the current media content item (for example, subtracting a current time with the timestamp time).

In some examples, the group session engine 160 receives updated session state information when the session state is updated. In other examples, the group session engine 160 facilitates periodically requesting an updated session state from the cloud host server 220. In other examples, scheduled events cause the group session engine 160 to request an updated session state.

In the examples, where the media playback device 140 is associated with a host user account for the group session, the group session engine may also transfer the current state on the host user's media-playback device to the cloud host server 220.

Some embodiments of the memory device 146 also include a media content cache 156. The media content cache 156 stores media content items, such as media content items that have been previously received from the media delivery system 102. The media content items stored in the media content cache 156 can be stored in an encrypted or unencrypted format. The media content cache 156 can also store metadata about media-content items such as title, artist name, album name, length, genre, mood, era, etc. The media content cache 156 can also store playback information about the media content items, such as the number of times the user has requested to playback the media content item or the current location of playback (e.g., when the media content item is an audiobook, podcast, movie, or the like for which a user may wish to resume playback).

The content output device 148 operates to output media content. In some embodiments, the content output device 148 generates the media output 112 for the user(s). Examples of the content output device 148 include a speaker, an audio output jack, a Bluetooth® transmitter, a display panel, and a video output jack. Other embodiments are possible as well. For example, the content output device 148 may transmit a signal through the audio output jack or Bluetooth® transmitter that can be used to reproduce an audio signal by a connected or paired device such as headphone or a speaker.

The data communication device 150 operates to enable the media playback device 140 to communicate with one or more computing devices over one or more networks, such as the network 108. For example, the data communication device 150 is configured to communicate with the media delivery system 102 and receive media content from the media delivery system 102 at least partially via the network 108. The data communication device 150 can be a network interface of various types which connects the media playback device 140 to the network 108. Examples of the data communication device 150 include wired network interfaces and wireless network interfaces. Wireless network interfaces can include or be implemented with technologies including infrared technology, Bluetooth® wireless technology, Bluetooth® low energy technology, 802.11a/b/g/n/ac technology, cellular technology, or radio frequency interface technology, among others. Examples of cellular network technologies include LTE, UMTS, CDMA2000, GSM, cellular digital packet data (CDPD), and MOBITEX.

The system 100 further includes a media delivery system 102. The media delivery system 102 comprises one or more computing devices and provides media content items to the media playback device 140 and, in some embodiments, other media playback devices as well. The media delivery system 102 includes a media server 180 and a cloud host server 220. Although FIG. 2 shows a single media server 180 and a single cloud host server 220, some embodiments include multiple media servers and cloud host servers. In these embodiments, each of the multiple servers may be identical or similar and may provide similar functionality (e.g., to provide greater capacity and redundancy, or to provide services from multiple geographic locations). Alternatively, in these embodiments, some of the multiple servers may perform specialized functions to provide specialized services (e.g., services to enhance media content playback during travel, etc.). Various combinations thereof are possible as well.

The media server 180 transmits stream media to media playback devices such as the media playback device 140. In some embodiments, the media server 180 includes a media server application 182, a processing device 184, a memory device 186, and a data communication device 188. The processing device 184, memory device 186, and the data communication device 188 may be similar to the processing device 144, memory device 146, and the data communication device 150 respectively, which have each been previously described.

In some embodiments, the media server application 182 streams music or other audio, video, or other forms of media content. The media server application 182 includes a media stream service 192, a media data store 194, and a media application interface 190. The media stream service 192 operates to buffer media content such as media content items 206, 208, and 210, for streaming to one or more streams 200, 202, and 204. The streams are sent to one or more media playback devices over a stream media channel 230 over the network 108.

The media application interface 190 can receive requests or other communication from media playback devices or other systems, to retrieve media content items from the media server 180. In some examples, the media application interface 190 operates to establish a communication channel 226 with one or more media playback devices over the network 118.

In some embodiments, the media data store 194 stores media content items 212, media content metadata 214, and playlists 216. The media data store 194 may comprise one or more databases and file systems. Other embodiments are possible as well. As noted above, the media content items 212 may be audio, video, or any other type of media content, which may be stored in any format for storing media content.

The media content metadata 214 operates to provide various information associated with the media content items 212. In some embodiments, the media content metadata 214 includes one or more of title, artist name, album name, length, genre, mood, era, etc. The playlists 216 operate to identify one or more of the media content items 212 and. In some embodiments, the playlists 216 identify a group of the media content items 212 in a particular order. In other embodiments, the playlists 216 merely identify a group of the media content items 212 without specifying a particular order. Some, but not necessarily all, of the media content items 212 included in a particular one of the playlists 216 are associated with a common characteristic such as a common genre, mood, or era. The playlists 216 may include user-created playlists, which may be available to a particular user, a group of users, or to the public.

The cloud host server 220 manages a group playback session including sending updated session state packages to the several media playback devices, such as the media playback device 140. In some embodiments, the cloud host server 220 executes the cloud host application 110, and includes a processing device 234, a memory device 236, and a data communication device 238. The processing device 234, memory device 236, and the data communication device 238 may be similar to the processing device 144, memory device 146, and the data communication device 150 respectively, which have each been previously described.

In some embodiments, the cloud host application 110 includes an interface which receives requests and other communications from various media playback devices or other systems. For example, the interface can receive commands, requests to join, request to create a session, and player state information. The interface can also send session state information to a plurality of media-playback devices. In some examples, the interface operates to establish a communication channel 228 with one or more media playback devices over the network 108.

The cloud host application 110 operates to manage a group session. The cloud host application 110 creates a group session, adds members to the group session, and tracks a group session state. Examples of the cloud host application 110 are illustrated and described in FIGS. 3 and 4.

Figure 3:
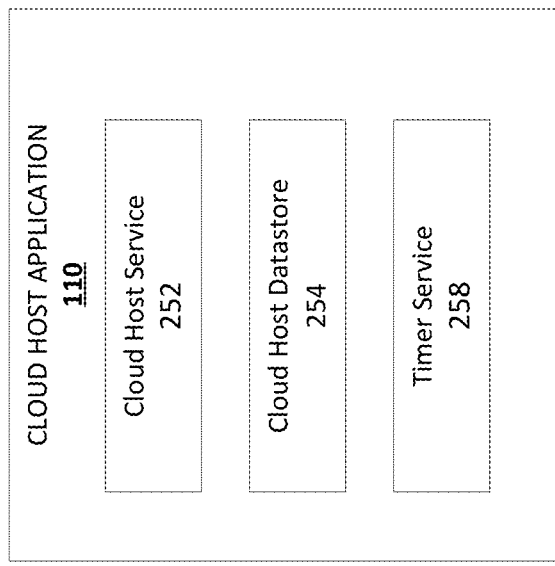
FIG. 3 illustrates an example cloud host application.

FIG. 3 illustrates an example cloud host application 110. The cloud host application 110 operates to manage a group session. The cloud host application 110 includes a cloud host service 252 a cloud host data store 254, and a timer service 258.

The cloud host service 252 operates to manage a group session and a session state. Examples of managing the group session include managing members of the group session, group session access settings, validation of commands, adding a user, removing a member from the group session, and deleting the group session. Examples of managing a session state include transferring an initial state from a host user, updating a state based on a command, scheduling an event to update the state with the timer service 258, and propagating the current state to some or all of the media playback devices in the group session.

In some examples the cloud host service 252 receives a command from a media playback device. The cloud host service 252 validates the command by checking if the user account which sent the command has permission for the specific command. If the user has access to the command the cloud host service 252 will update the state based on the command.

The cloud host data store 254 stores group session data and session state data. Examples of group session data includes group session ID and user account ID for group members. Additional permissions for user accounts, host information, administrator information can also be stored in the cloud host data store 254. Examples of session state data include, current song, next song, queue of songs, current playlist, current album, timestamp of last state, duration of current song etc.

The timer service 258 manages scheduled time-based tasks. For example, the timer service may receive a task from the cloud host service 252 requesting a callback at the time a media content item is completed. In some examples, the callback is a scheduled "http" call back. In some examples, the timer service 258 also cancels scheduled callbacks.

Figure 4:
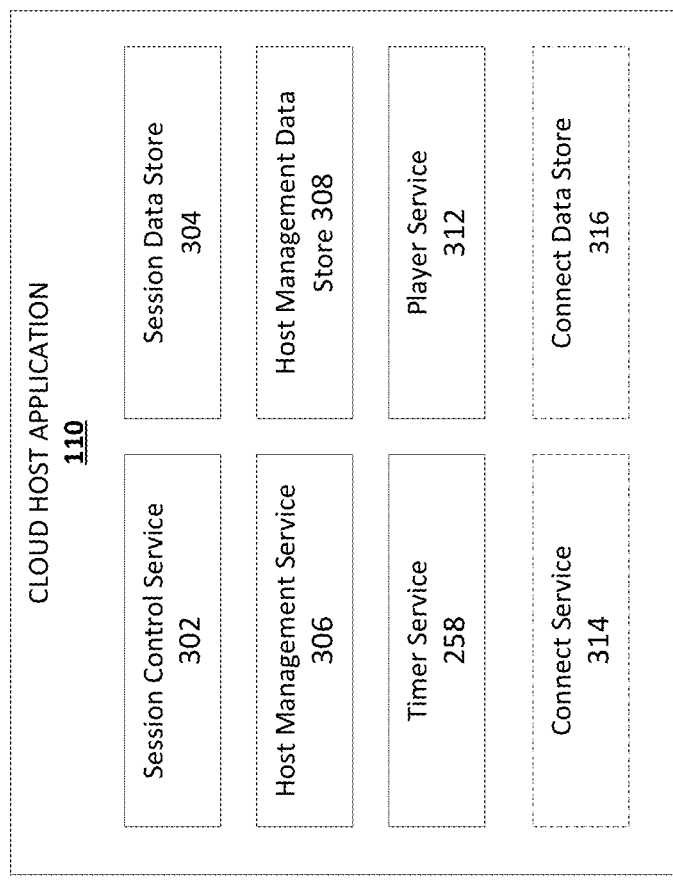
FIG. 4 illustrates an example cloud host application.

FIG. 4. Illustrates an example cloud host application 110. The cloud host application 110 operates to manage a group session. The cloud host application 110 illustrated in FIG. 4 is another example of a cloud host application 110 illustrated in FIGS. 2-3. The cloud host application 110 includes a session control service 302, a session data store 304, a host management service 306, a host management data store 308, a timer service 258, a player service 312, a connect service 314, and a connect data store 316.

The session control service 302 operates to create a group session. The session control service 302 is responsible for keeping track of the user accounts in the session, and the access levels for each member user accounts. In some examples, the session control service 302 receives a request to create a group session from a host user account.

In some embodiments, the session control service 302 creates a group session with a group session ID. The group session ID and the host user account ID are stored in the session data store 304. In some examples, the host user account ID is stored as the host of the group session. In other examples, the host user account ID is stored as an administrator for the group session. In these examples, an administrator user account may add other accounts as administrators. In some embodiments, the session control service 302 adds members to the group session and updates a stored list of members in the session data store 304.

In some examples, the session control service 302 receives commands from one or more media playback devices, where each media playback device is associated with a user account. The session control service 302 validates the command by checking the user account in the session data store 304. For example, the group session can be configured to only allow administrator group session members to change the current media content item. In this example, the session control service 302 checks if the user account is an administrator for the group session before validating a command to change a current media content item.

The host management service 306 operates to manage the session state for a group session. The host management service 306 is configured to track the current session state for the group session. some examples, the host management service 306 receives a create session request from the session control service 302. The host management service 306 then creates an initial session state which may include a current media content item and an end time of the media content item. The host management service 306 will store the session state information in the host management data store 308.

The session state includes the context of the group session. Typically, the session state includes information like current media content item for the group session, playback time position of the media content item, one or more timestamps for changes to the session state, next media content item in a queue, list of previous media content items played, and other group session context information. In a music streaming example, the session state may include whether the session is listening to an album and track the progress through the album or if the session is listening to a playlist and track the progress through a playlist. In some examples, user accounts may have different access levels. For example, some users may have a premium account and other users may have a free account. Users on the free account may have limited options for skipping media content items. The session state may store a tracker for the number skips allowed based on the user account level.

Additionally, in some examples, the session state includes a timestamp indicating when the last change to the state was made. The server uses the timestamp to determine the offset of the current media content item. For example, if a participant of the group session selects a song to play a timestamp is stored in the session state for this selection. This timestamp is used to calculate an offset indicating how far the playback of the song has progressed. In some examples, this offset is sent to a new participant joining the session. The new participant media playback device uses this offset to output the song at the correct time to participate in the group session.

Typically, the session state does not track information which is specific to a media playback device which is joined to the group session. For example, a media playback device may require the media content item is in a specific format to play the media content item. The session state can provide the state information to such a device which will request the media content item in the required format from the media delivery system.

The session state is stored in the host management data store 308. In some examples, the session state is stored in a file. The session state can be stored as a data structure which is sent to various devices as a data packet.

In some examples, the player service 312 updates the session state when the cloud host application receives a command. The player service 312 updates the session state based on the received command. For example, if the command is to skip forward 15 seconds in a current media content item the player service will update the state to reflect the command. Other examples, include skipping to a next song, adding a song to a queue, and setting a song to repeat. Other group session commands are also possible.

In some examples, the host management service 306 schedules a media content item transition with the timer service 258. The timer service 258 may receive a media content item end time. For example, if the media content item is a song that is two minutes, the host management service 306 sends a request to the timer service 258 to notify the host management service 306 when two minutes has passed. The timer service 258 will keep track of time and send a notification to the host management service 306. When the host management service 306 receives this notification the host management service 306 updates the state with the next media content item. Another example of the timer service 258 is illustrated in FIG. 3.

The connect service 314 operates to connect members of the group sessions playback devices. In some examples, a member of the group session may have a cluster of devices for playback. For example, a member may have a mobile phone device which is used to control the audio output and a Wi-Fi® enabled speaker for generating the audio output. The connect service 314 operates to store a connect state for that member which can be updated from any of the members devices. The connect service 314 also tracks which devices in a cluster are generating media output. The connect state information for various user accounts is stored in the connect data store 316. Examples of devices which may be in a cluster include smart phone, laptop, desktop, gaming counsel, smart speaker, and smart TV. In many embodiments the connect service may run as a separate service from the cloud host application 110 and includes an interface with the cloud host application 110.

In some embodiments, the connect service 314 receives a current state from a media playback device. In some examples, the connect service 314 receives a current state from a user account creating a group session. The connect service 314 can transfer ownership of the connect state to the host management service 306. For example, the connect service 314 stores the playback state from the host device in the connect data store 316. This state is transferred to the host management service 306 when the host member initiates a group session. This state acts as the initial state for the group session. Accordingly, in these examples, the group session will not start with a blank state. In other embodiments, the group session starts with a blank state or a predefined group session state which is not the connect state from the host member.

Once a group session is created the connect service 314 is used to propagate the session state information to a member's cluster of devices. In some examples, the connect service 314 propagates the session state information to active devices. For example, if one member is active on a smart phone for control and is listening to the audio output on a smart speaker the connect service 314 will send updated state information to the smart phone and smart speaker.

In some embodiments, the one or more devices associated with a member's account and playing the media content is not static and changes during the group session. In these embodiments, a member may start the playback session on one device but switch the playback to another device. For example, a member may start the session with playback on their smart phone and switches the playback to a smart speaker. In other examples, a user may add multiple devices performing the playback. In the pervious example, a user may have playback on their smart phone and add playback on a smart speaker. The connect service 314 manages a member's devices to facilitate sending updated session states to the active devices for each member.

Figure 5:
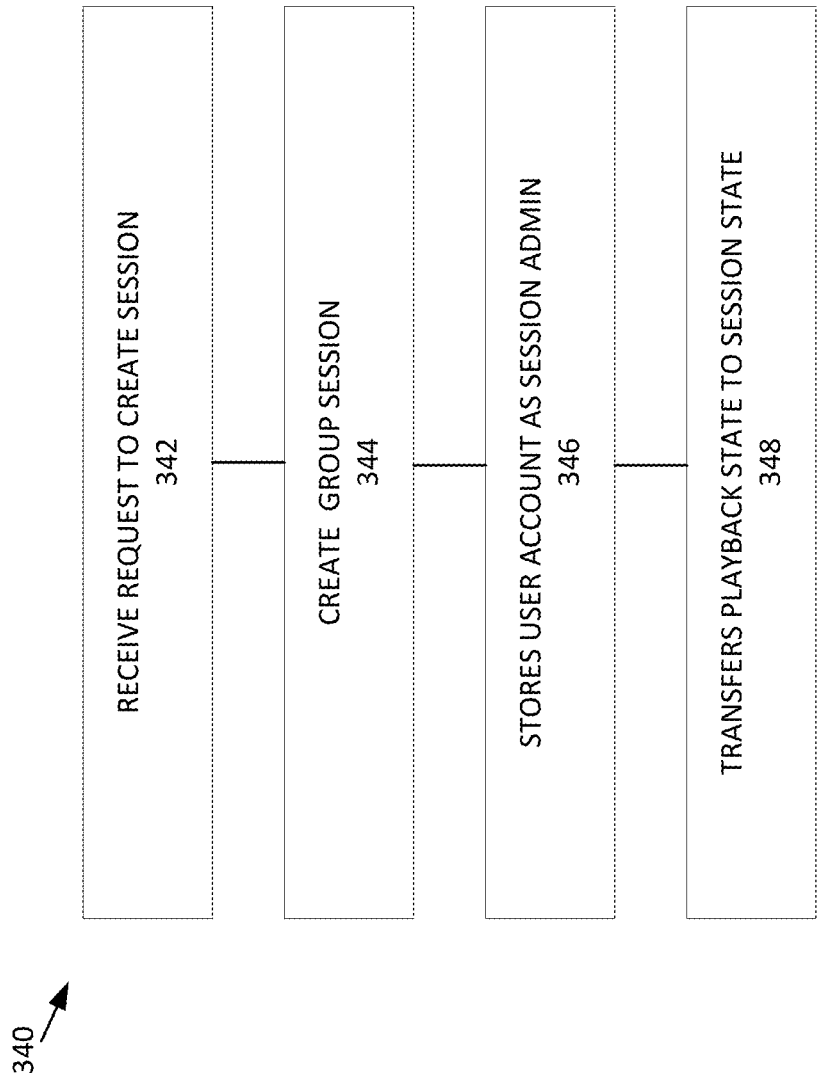
FIG. 5. illustrates an example method for creating a group session.

FIG. 5. illustrates an example method 340 for creating a group session. In some examples, the method 340 runs on the cloud host server 220 as shown in FIG. 2. The method 340 can be implemented as part of the cloud host application 110. The method 340 includes the operations 342, 344, 346, and 348.

The operation 342 receives a request to create a session. In some embodiments, the cloud host application will check if the user account is already a member of a group session. If the user account is a member of a group session the operation the operation 342 sends a message to the user's device asking if the user would like to join the current group session or create a new session. In other embodiments, the operation 342 may automatically send a session state to the user's device which will update the playback state on that device to the group session state. If the user account which sent the request to create a session is not a member of a group session the method 340 will continue to the operation 344.

The operation 344 creates a group session. In some examples, creating a group session includes generating a group session ID which the user account can share with other users. The group session ID allows other users to discover and join the group session. In some embodiments, creating a group session further allows the user creating the session to make other rules, permissions, and configurations to the group session.

The operation 346 stores the user account as session administrator. In some embodiments, the user account creating the group session is added as a host member for the group session. The host member can promote other members to the host member role. For example, when the host member wants to leave the group session the host member can select another member to promote to the host role. In other embodiments, the user account creating the group session is added as administrator member to the session. The administrator member can add other users to have administrator member permissions.

In some embodiments creating a group session is complete after the operation 346 and the cloud host application will wait to receive a command from a group session member selecting and playing a media content item. For example, the group session starts with a blank group session state and a member of the session must make selections of one or more media content items to start playback. In other embodiments, creating a session state further includes transferring the initial group session state from the playback state from the media playback device which is creating the group session. In these embodiments, creating a croup session further includes the operation 348.

The operation 348 stores the user account playback state, or connect state, as the session state. The playback state on the media content device which is creating the group session is received by the cloud host application. For example, the playback state on the media content device may include a current media content item and a timestamp of when the song started. The playback state may also include other state information like a queue of next songs, a current album, and a current playlist. Once the playback state is received it is stored as the group session state. Other members are then able to receive this group session state when they join the group session.

Figure 6:
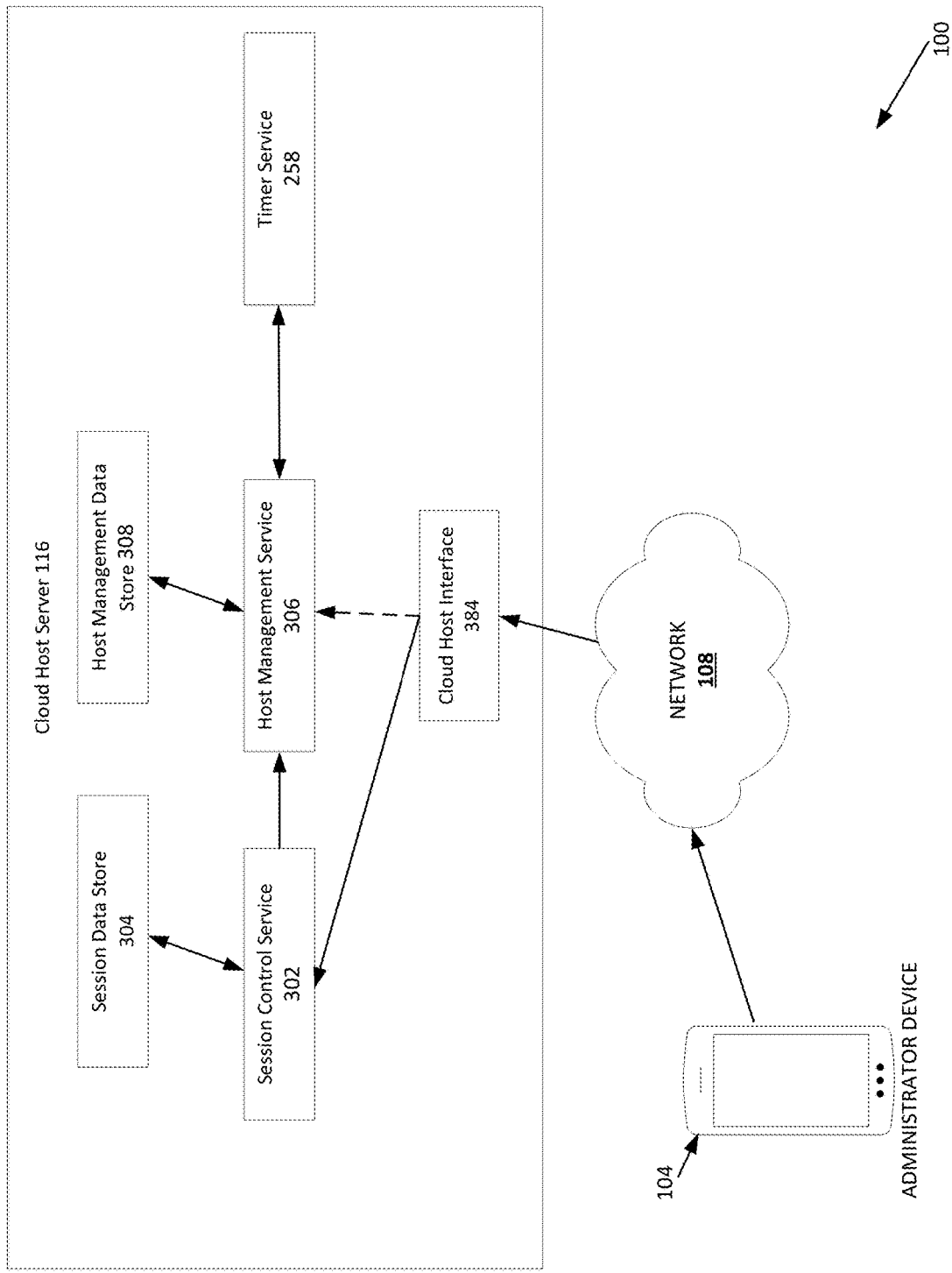
FIG. 6 is a schematic illustration of an example group session system.

FIG. 6 is a schematic illustration of an example group session system 100. As shown, the example group session system 100 illustrates the process for starting a group session. The system 100 includes an administrator media playback device 104, a network 108, a cloud host interface 384, a session control service 302, a session data store 304 a host management service 306, a host management data store 308, and a timer service 258.

In this example, creating and starting a group session starts with the administrator media playback device 104 sending a create session request with an initial group session state to the cloud host server 116 via the network 108. In some examples, the request and initial state are received by the cloud host interface 384 which directs the request and initial state to the session control service 302.

The session control service 302 creates the session and adds the user account associated with the administrator media playback device 104 as an admin member of the session. The session control service 302 stores the session and the members of the session, including the admin member, in the session data store 304. The session data store 304 keeps track of what user accounts are in specific sessions and access and control permissions for group sessions. In other embodiments the create session request is sent to the host management service 306. However, in the typical embodiment, the create session request is directed to the session control service 302 and after the session is created communications with the cloud host server 116 are directed to the host management service 306.

The session control service 302 sends a create session request to the host management service 306 with the initial group session state. The host management service stores the initial state in the host management data store 308. The host management data store 308 stores the session state and connected devices.

The host management service 306 schedules an end of media content event using the timer service 258. The timer service 258 schedules a call back at the scheduled time. The callback is sent to the host management service 306 to update the group session state. In some examples, the timer service may schedule an event with a cloud task service. In other examples, the timer service, performs the timer task.

Figure 7:
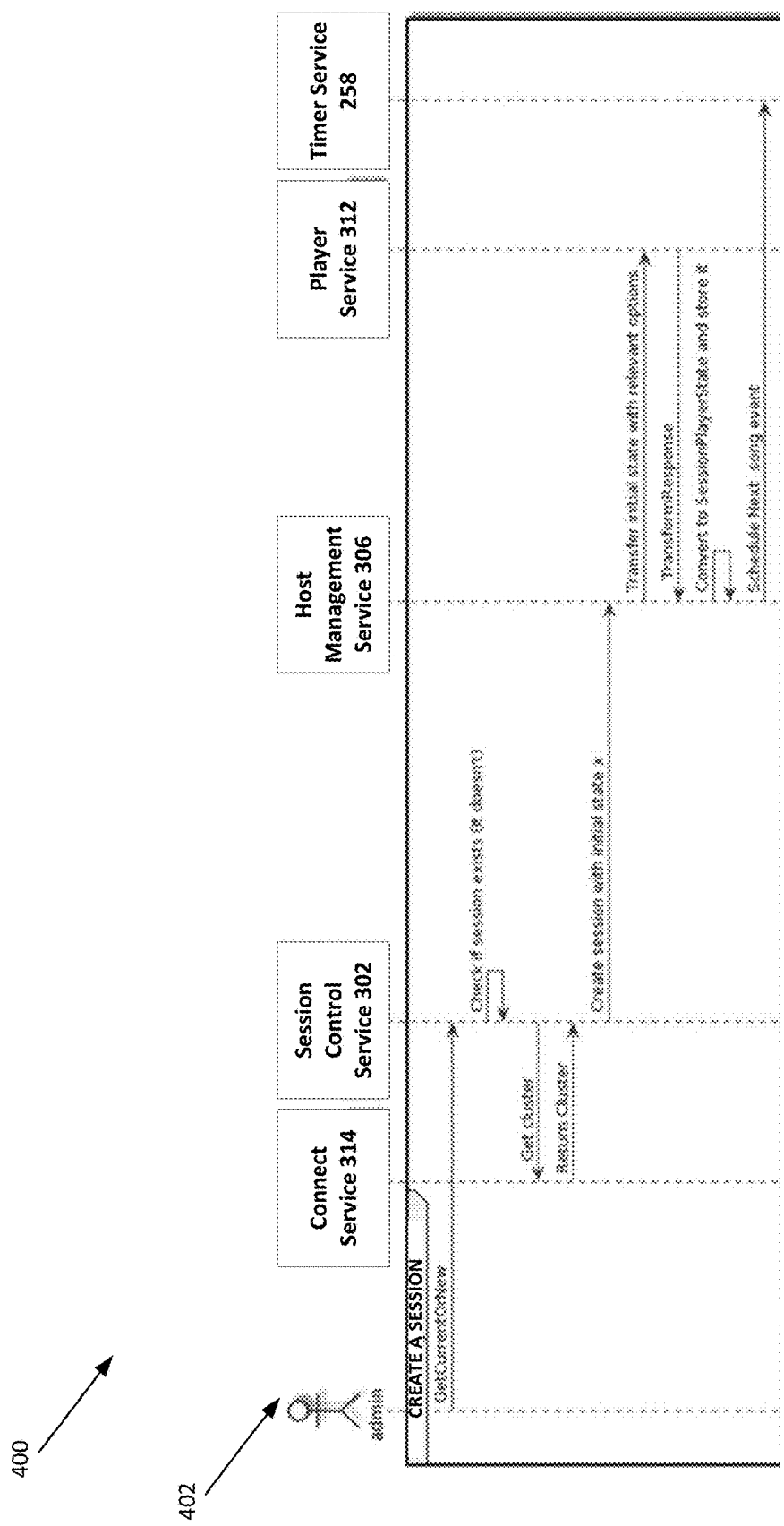
FIG. 7 illustrates an example method, illustrated as a communication diagram, for creating a group session.

FIG. 7 illustrates an example method 400, illustrated as a communication diagram, for creating a group session. The method 400 as illustrated includes an administrator account device 402, a connect service 314, a session control service 302, a host management service 306, a player service 312, and a timer service 258. The method 400 is another example of the method 340 illustrated in FIG. 5. The connect service 314, session control service 302, host management service 306, player service 312, and timer service 258 operate as illustrated and described in FIG. 4.

In the example shown, an administrator account sends a request to retrieve a current group session, if one exists, or create a new group session. The request is routed to the session control service 302 which checks if the session exists. In the example shown, a group session does not exist. Next, the session control service 302 gets a cluster from the connect service for the account associated with the administrator account device 402. In some examples, the cluster is used to transfer the connect state for the account. The session control service 302 sends a request to create a session with an initial state to the host management service 306. The host management service 306 sends the initial state to the player service 312 to transfer control of the state to the host management service 306. The host management service 306 converts the player state associated with the administrator account to a session state and stores the session state. At this step a group session is created and the host management service 306 can schedule a next media content item event with the timer service 258.

Figure 8:
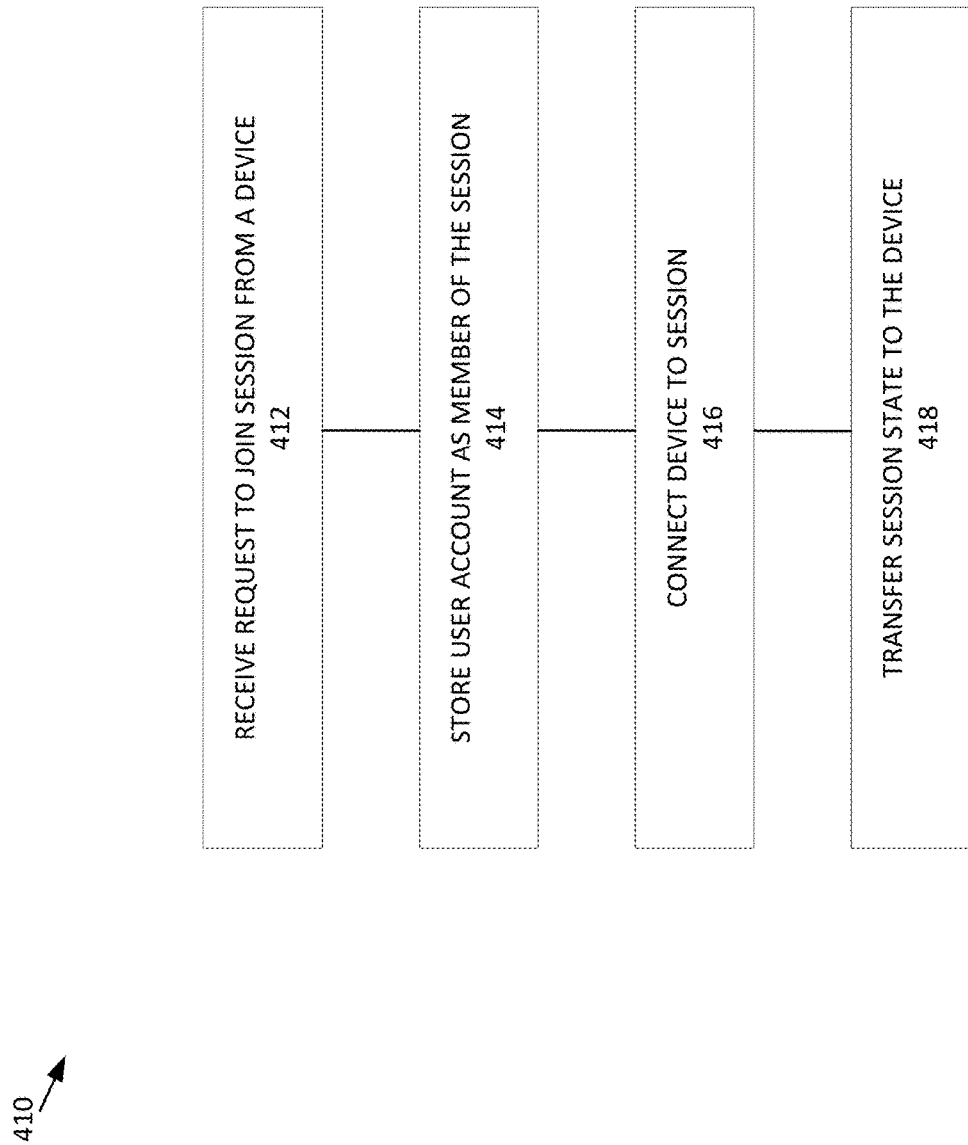
FIG. 8 illustrates an example method for joining a group session.

FIG. 8 illustrates an example method 410 for joining a group session. In some examples, the method 410 runs on the cloud host server 220 as shown in FIG. 2. The method 410 can be implemented as part of the cloud host application 110. The method 410 includes the operations 412, 414, 416, and 418.

The operation 412 receives a request to join a group session from a media playback device associated with a user account. In some examples, the operation 412 determines whether the user account is able to join the group session. In some examples, the group session may require some verification before the user is allowed to join the group session. Other examples, the service checks if the user account contains a relationship with an administrator members account. In other examples, users may only access the group session if they have access to the group session ID and no further verification is required.

In some examples, the operation 412 provides options to the user of different group session experiences. One experience includes listening to the group session on each of the member user's devices. For example, the user may want to join a group session with one or more other users located in different locations. Another experience includes listening to the group session with playback on the host device. For example, the user may be in the same location as a host who wants to share media content playback control with the joining user while the actual playback is only on the host device.

The operation 414 stores the requesting user account as a member of the session. Typically, the user account is stored with a list of members in a session data store. The operation 414 may store the user account in different roles. Examples of roles include host role, guest role, administrator role, etc. The different roles can have different levels of permission. For example, a group session can be configured to only allow administrator role users to modify the media content items.

The operation 416 connects the requesting device to the group session. In some examples, the operation 416 takes ownership of the device's playback state to the group session. In these examples, the devices state is updated by the group session state to match the sessions state. In some examples, a member uses a connect service to cluster devices. In these examples, the member has a connect state. When joining a group session, the connect state ownership is transferred to the group session. Accordingly, the connect state is updated when the session state is updated.

The operation 418 transfers the session state to the device joining the group session. Typically, the operation 418 includes transferring the group session state to the new user's device. In some examples, the device will modify its media content output and display to match the group session state. In other examples, based on a selected experience, the device will not output media content, but the display will match the group session state. The display matching the group session state allows the user to provide inputs which send commands for controlling the group session.

Figure 9:
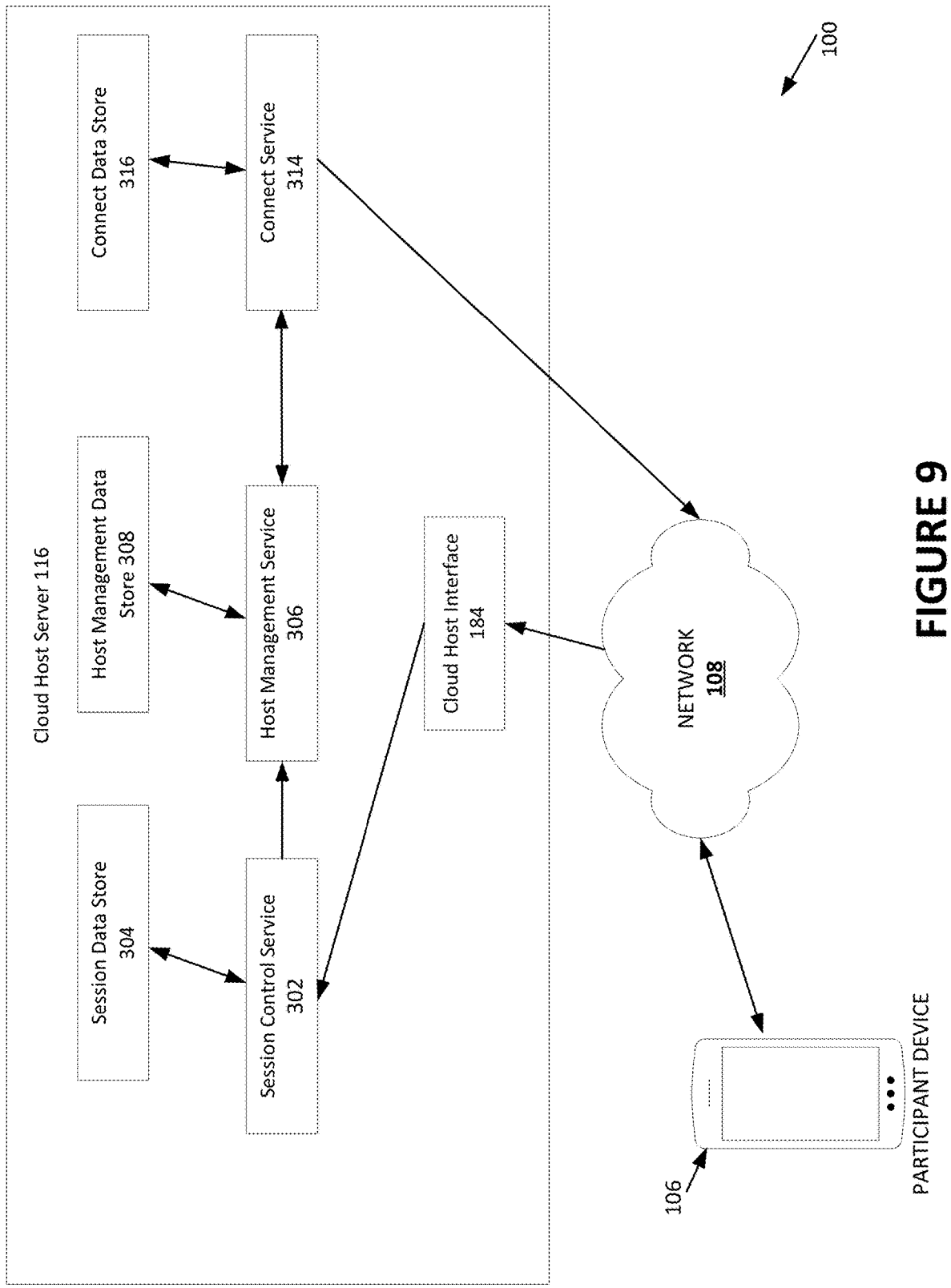
FIG. 9 is a schematic illustration of an example group session system.

FIG. 9 is a schematic illustration of an example group session system 100. As shown, the example group session system 100 illustrates the process for joining a group session. The system 100 includes a participant media playback device 106, a network 108, a cloud host server 116. The example cloud host server 116 includes a cloud host interface 384, a session control service 302, a session data store 304, a host management service 306, a host management data store 308, a connect service 314, and a connect data store 316.

In this example system 100, the participant media playback device 106 sends a request to join a session to the cloud host server 116 over the network 108. The request is routed to the session control service 302 via a cloud host interface 384. The session control service 302 adds an account associated with the participant media playback device 106 to a list of members of the group session. The list of members is stored in the session data store 304. The session control service 302 sends a request to join a group session to the host management service 306. The host management service 306 sends a request to the connect service 314 to take ownership of the accounts connect state which is saved in the connect data store 316. The host management service 306 requests the session state stored in the host management data store 308 and sends the session state to the participant media playback device 106 via the connect service 314 and the network 108. In other examples, a host or administrator device joins a group session using the same process as the participant media playback device 106.

Figure 10:
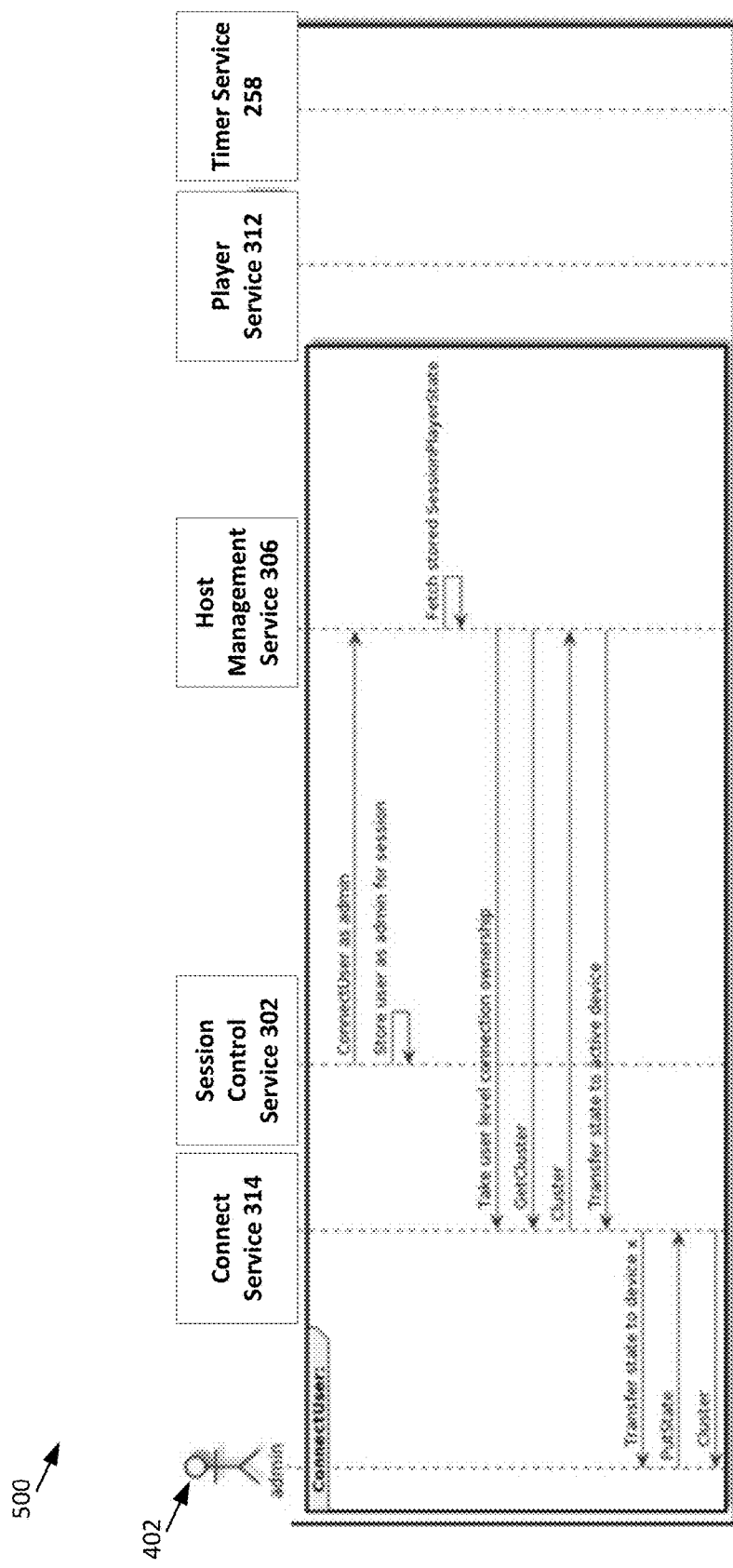
FIG. 10 illustrates an example method, illustrated as a communication diagram, for joining a group session.

FIG. 10 illustrates an example method 500, illustrated as a communication diagram, for joining a group session. The method 500 as illustrated includes an administrator account device 402, a connect service 314, a session control service 302, a host management service 306, a player service 312, and a timer service 258. The method 500 is another example of the method 410 illustrated in FIG. 8. In some examples, the method 500 is a continuation of the method 400 as the administrator account device 402 joins the session after creating the session.

In this example, session control service 302 notifies the host management service 306 to connect the user account as an administrator account for the group session. The session control service 302 stores the account as an administrator member. The host management service 306 fetches the current session state. Next, the host management service 306 sends a request to the connect service 314 to take ownership of the connect state for administrator account devices. In some examples, the host management service 306 will request a cluster of devices associated with the administrator account from the connect service 314. This allows the host management service 306 to send session updates to the active playback devices for the different members in the session. The host management service 306 propagates session state information by sending a session state data package to the connect service 314 with will propagate the session state data package to devices in the administrator account's cluster.

Figure 11:
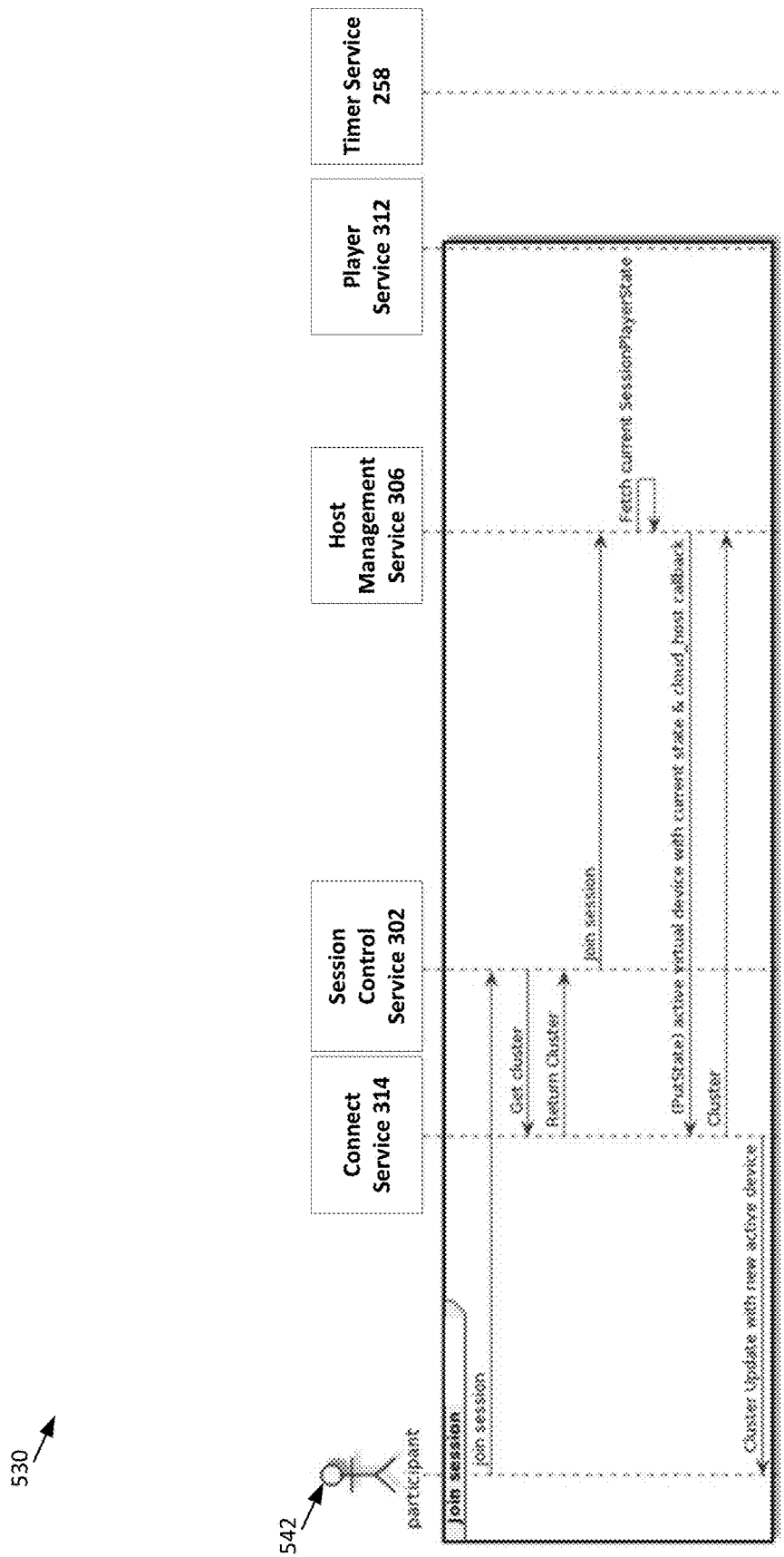
FIG. 11 illustrates an example method, illustrated as a communication diagram, for joining a group session.

FIG. 11 illustrates an example method 530, illustrated as a communication diagram, for joining a group session. The method 530, as illustrated, includes a participant account device 542, a connect service 314, a session control service 302, a host management service 306, a player service 312, and a timer service 258. The method 530 is another example of the method 500 illustrated in FIG. 8 and the method 500 illustrated in FIG. 10.

In this example, the participant account device 542 sends a request to join a session to the session control service 302. The session control service 302 requests the connect state, including active devices associated with the user account from the connect service 314. The session control service 302 sends a join session command to the host management service 306. The host management service 306 fetches the current session state (in some examples, from a host management data store) and sends the session state to the connect service 314 which updates the cluster of active devices by sending a session state data package.

Figure 12:
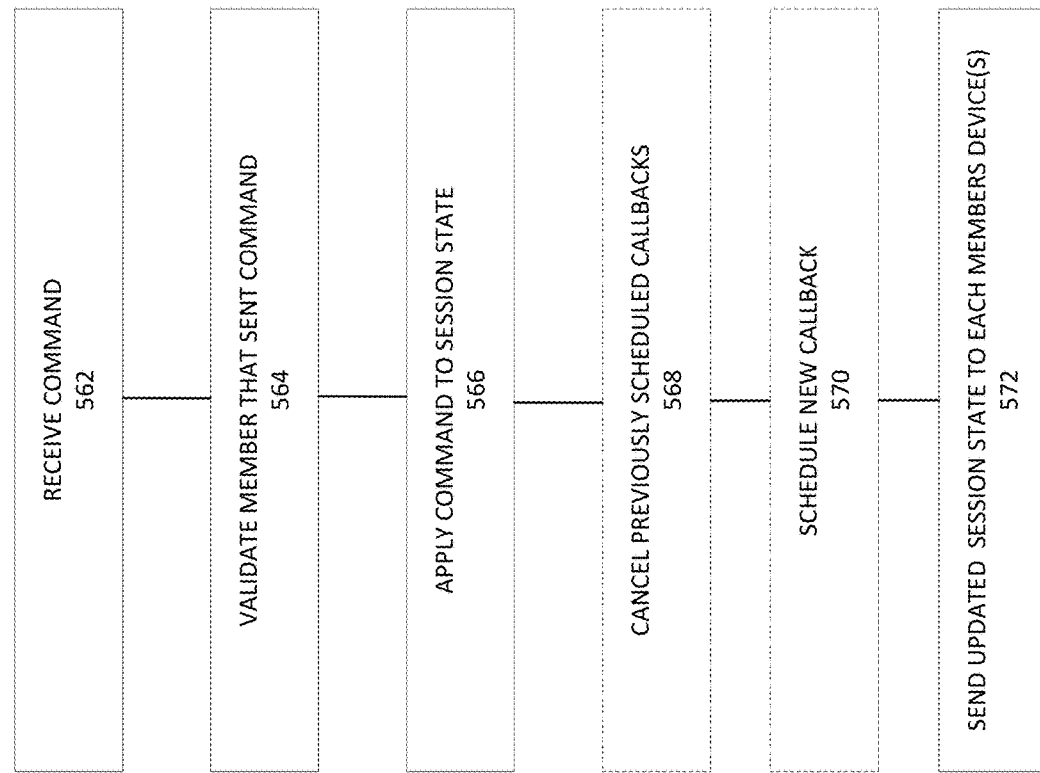
FIG. 12 illustrates an example method for updating a session state based on a command.

FIG. 12 illustrates an example method 560 for updating a session state based on a command. In some examples, the method 410 runs on the cloud host server 220 as shown in FIG. 2. The method 410 can be implemented as part of the cloud host application 110. The method 560 includes the operations 562, 564, 566, 568, 570, and 572.

The operation 562 receives a command from a device associated with a member of the group session. Examples of commands include, skipping a media content item, selecting a new media content item, tracking forward to backwards in a media content item, adding a song to a queue, etc.

The operation 564 validates the member that sent the command. In some group session configurations only administrator members can update the session state. In these examples, the operation 564 looks up whether the member has permission to update the session with the command. Other levels and configurations of account access are also possible.

The operation 566 applies the command to the session state. For example, if a member skips a song the session state is updated to the next song in the queue. In another example, if a member skips 15 seconds ahead in a media content item, the session state is updated to reflect the updated time in the media content item.

The operation 568 cancels previously scheduled callbacks. In some examples, a command makes a previously scheduled callback invalid. For example, if a current song is two minutes then a callback is scheduled at the end of the song. When a command is received which skips the current song the callback is no longer valid, and the operation will cancel this callback. In other examples, callbacks are not canceled, and the host management service will contain logic to filter out callbacks receive which are not valid. Other commands do not invalidate a scheduled call back. For example, adding a song to a queue does not impact a scheduled callback.

The operation 570 schedules a new callback based on the session state. In the example where a user skips a song, the operation 570 will schedule a new end of song call back based on the duration of the new song. Some commands do not require scheduling a new call back, for example, adding a new song to a queue.

The operation 572 sends the update session state to each group session members devices. In some examples, a session state data package is constructed based on the updated session and this package is sent to all active devices in the group session.

Figure 13:
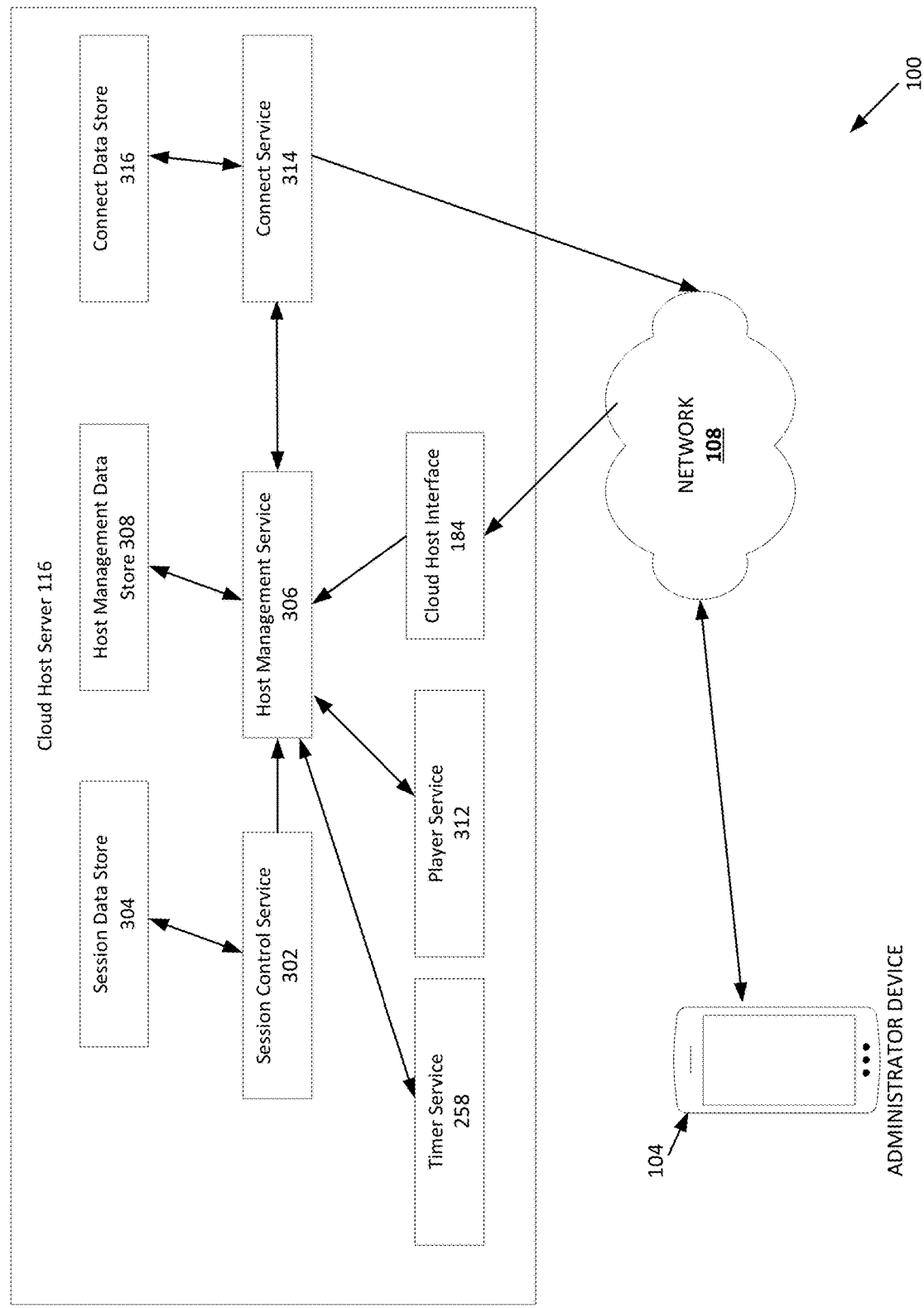
FIG. 13 is a schematic illustration of an example group session system.

FIG. 13 is a schematic illustration of an example group session system 100. As shown, the example group session system 100 illustrates the process for sending a command to update a group session. The system 100 includes an administrator media playback device 104, a network 108, a cloud host interface 384, a session control service 302, a session data store 304, a host management service 306, a host management data store 308, a connect service 314, a connect data store 316, a timer service 258, and a player service 312.

In this example the administrator media playback device 104 sends a command to the cloud host server 116 via the network 108. The command is routed to the host management service 306 via the cloud host interface 384. The host management service 306 asks the session control service 302 whether the member account associated with the device which sent the command has permission make the command. The session control service 302 checks the members permission stored in the session data store 304. If the member account has permission the host management service sends the command to the player service 312 which updates the session state based on the command. The host management service 306 cancels previously scheduled callbacks (e.g. end of song event callbacks) and schedules new callbacks based on the updated session state with the timer service 258. Next the host management service 306 sends the updated session state to all device via the connect service 314. The connect service 314 operates with the connect data store 316 to manage the members connected devices and send the updated state to all active member devices via the network 108.

Figure 14:
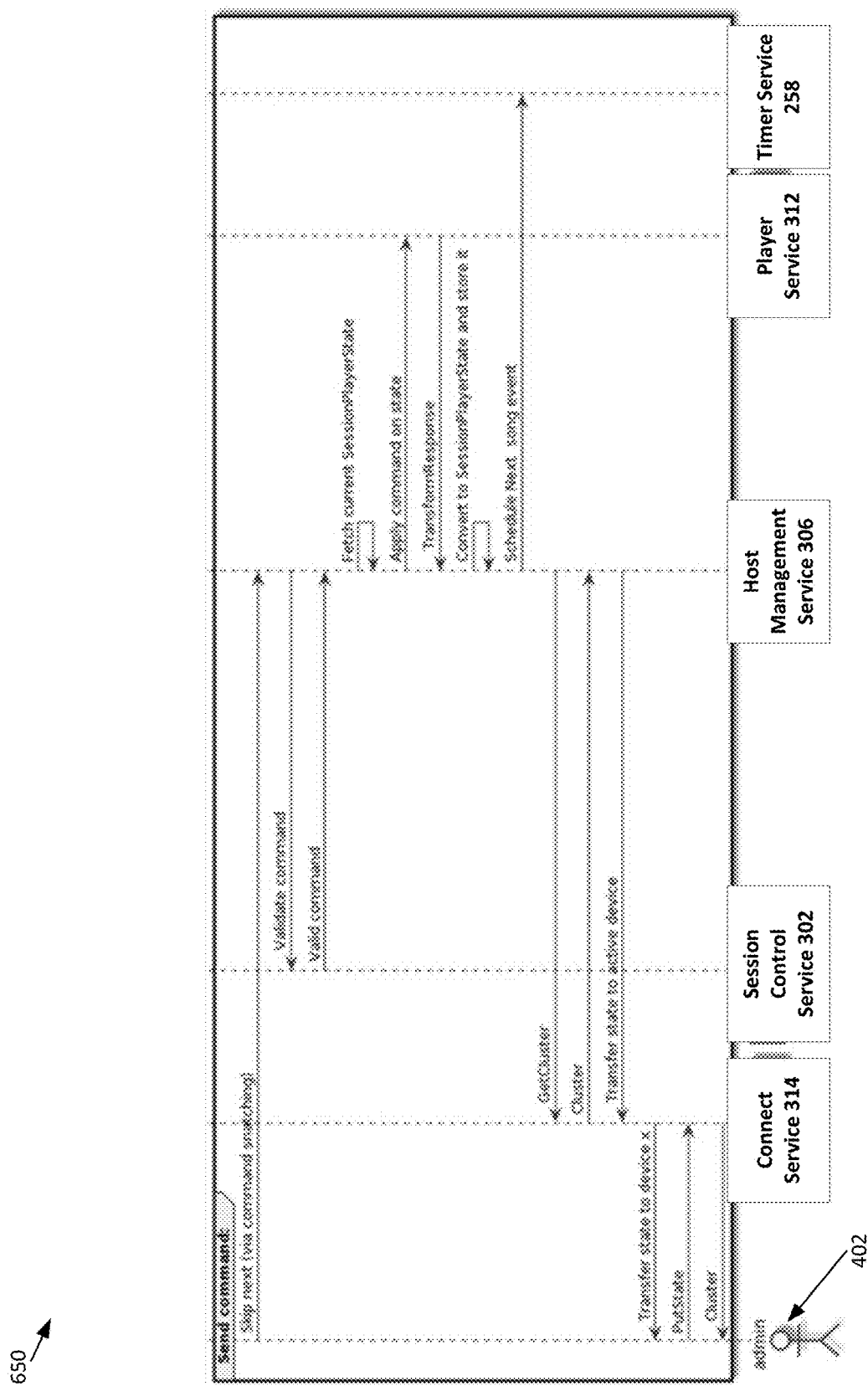
FIG. 14 illustrates an example method, illustrated as a communication diagram, for sending a command in a group session.

FIG. 14 illustrates an example method 650, illustrated as a communication diagram, for sending a command in a group session. The method 650, as illustrated, includes an administrator account device 402, a connect service 314, a session control service 302, a host management service 306, a player service 312, and a timer service 258. The method 650 is another example of the method 560 illustrated in FIG. 12.

In this example, the administrator account device 402 sends a command to skip to the next song. The command is sent to the host management service 306. The host management service 306 checks if the command is valid with the session control service 302. The session control service 302 checks if the account which sent the command has the correct permissions. Next, the host management service 306 fetches the current session state. The host management service sends the command and the current sessions state to the player service 312 which updates the session state based on the command. The host management service stores the updated state and schedules a next song event with the timer service 258. In some examples, the next song event is scheduled based on the length of the song. The timer service 258 notifies the host management service 306 when the scheduled time correlating to the length of the song has passed. The host management service 306 sends the updated state to all active member devices (including the administrator account device 402) using the connect service 314.

Figure 15:
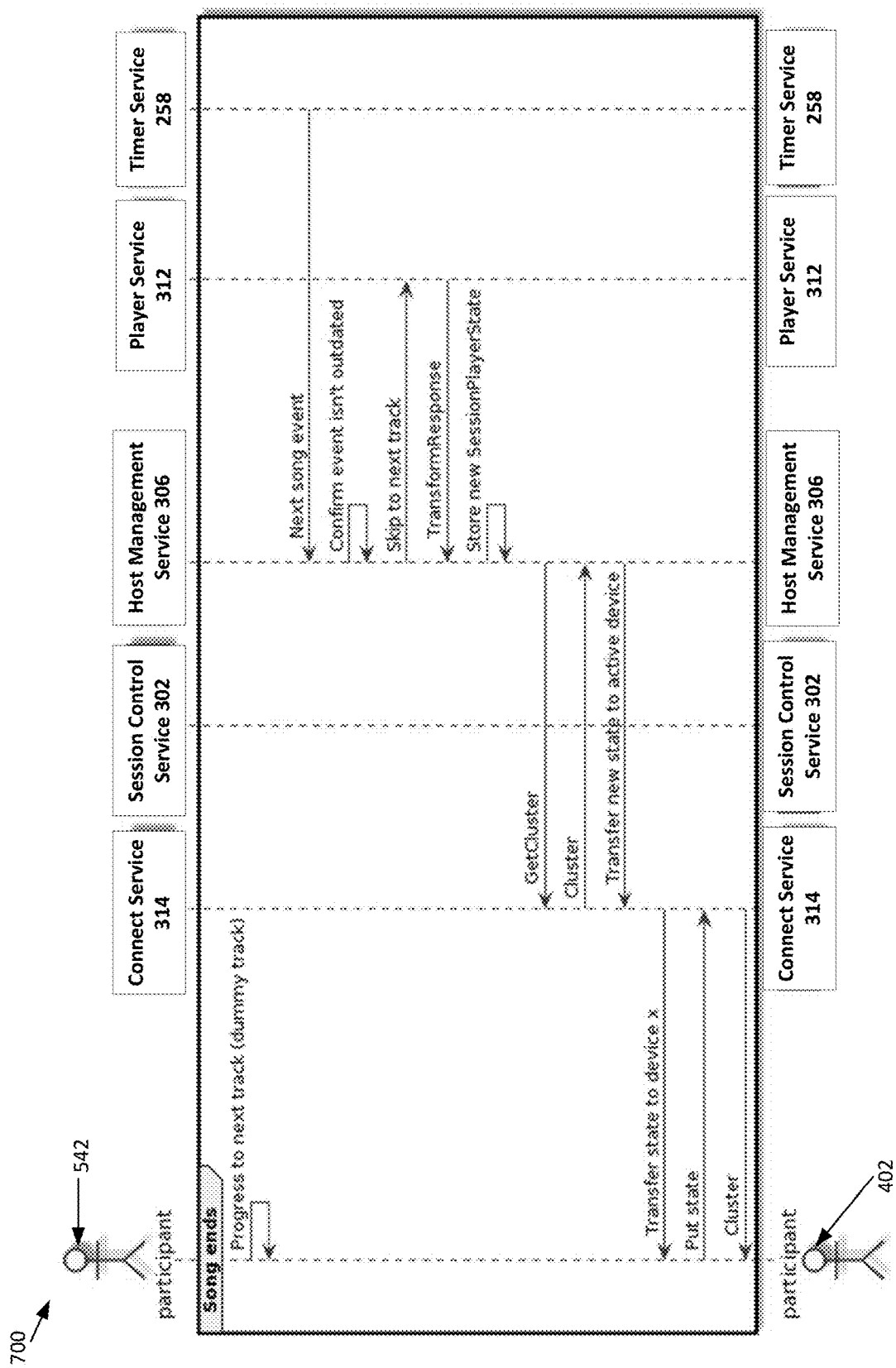
FIG. 15 illustrates an example method, illustrated as a communication diagram, for progressing to a next song in a group session.

FIG. 15 illustrates an example method 700, illustrated as a communication diagram, for progressing to a next song in a group session. The method 700, as illustrated, includes an participant account device 542, a connect service 314, a session control service 302, a host management service 306, a player service 312, and a timer service 258. The method 700 is another example of the method 560 illustrated in FIG. 12.

In this example, the participant account device 542 progresses to a dummy track. In some examples, the dummy track is a blank track which does not produce audio output. In some examples, while the dummy track is active a message is presented to the user informing the user that the playback is waiting for the group session to progress. The dummy track is used to ensure that the various member devices remain synced. For example, if a media content item on one media playback device is completed before other devices in the social listening session, the dummy track is made active until the session state sends an update to play a next media content item. In some examples, the session state is implemented to always track a small amount of time behind the member devices. In this implementation, each member device will play a dummy track until the session state sends an update with the next media content item. The purpose of the session state tracking a small amount of time behind every member device is to ensure the session state does not progress to the next session state before a device has completed the current media content item. In some examples, the session state is updated in a manner that the dummy track isn't noticeable to a user. In further examples, a dummy track is not used, and each member device automatically plays a next media content item.

In this example, the timer service 258 sends a scheduled callback to the host management service 306 informing the host management service 306 that it is time to update the session state to the next song. In some examples, the host management service 306 checks if the scheduled call back is still valid. The host management service 306 sends a next song command to the player service 312. The player service 312 returns an updated session state. The host management service 306 stores the updated state and sends the updated state to the connect service 314. The connect service 314 propagates the updated state to all active member devices including participant account device 542.

Figure 16:
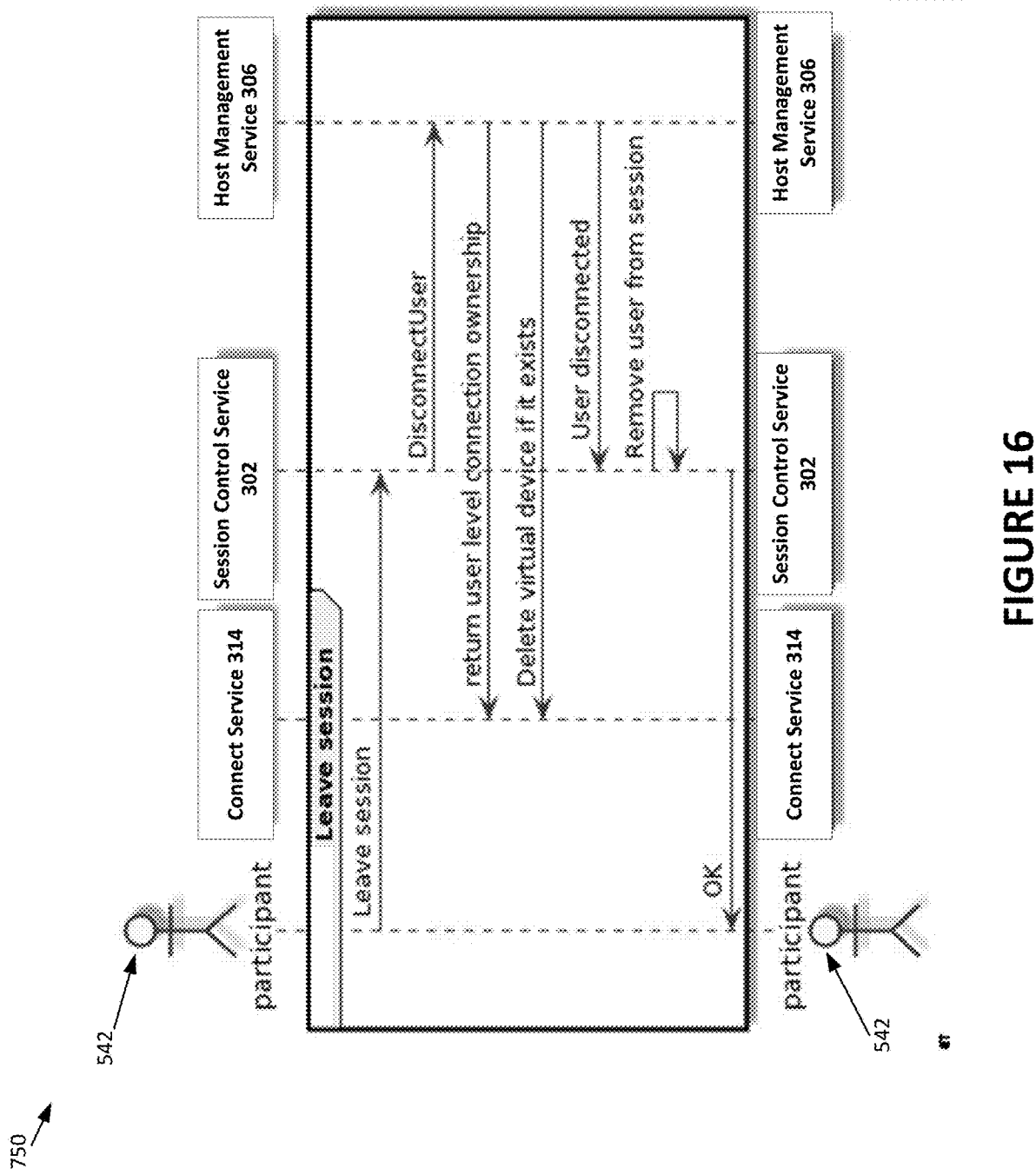
FIG. 16 illustrates an example method, illustrated as a communication diagram, for leaving a group session.

FIG. 16 illustrates an example method 750, illustrated as a communication diagram, for leaving a group session. The method 750, as illustrated, includes an participant account device, a connect service 314, a session control service 302, a host management service 306, a player service 312, and a timer service 258.

In this example, the participant account device 542 sends a request to leave the group session to the session control service 302, the session control service 302 sends the disconnect user command to the host management service 306. The host management service 306 sends a command to the connect service 314 to return ownership of the connect service from the host management service 306 to the participant account device 542.

The host management service 306 sends a user disconnected message to the session control service 302. This notifies the session control service 302 that the participant account can be removed from the member list for the group session. After removing the participant account from the member list, the session control service 302 sends a message to the participant account device 542 that the participant has successfully left the group session.

In some examples, after or before a host member leaves a session a new member will be promoted to the host role. In some embodiments, the session control service 302 will manage the member roles to select a new host. In other examples, the current host will select the next host before leaving a session. In other examples, a member will request to become a host either before or after the current host leaves.

Figure 17:
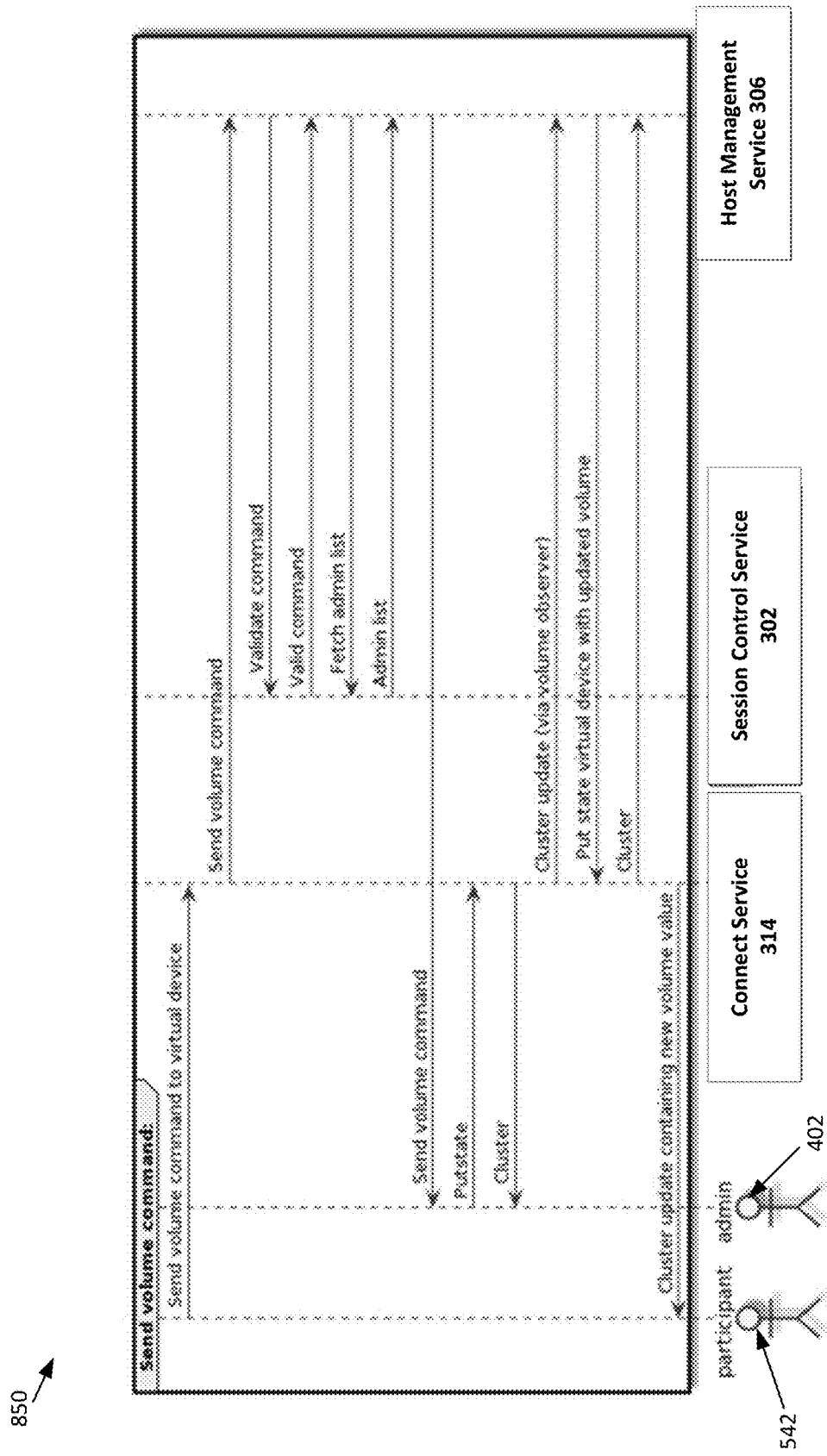
FIG. 17 illustrates an example method, illustrated as a communication diagram, for sending a volume command in a group session.

FIG. 17 illustrates an example method 850, illustrated as a communication diagram, for sending a volume command in a group session. The method 850, as illustrated, includes a participant account device 542, an administrator account device 402, a connect service 314, a session control service 302, and a host management service 306.

In many embodiments, volume commands are not valid for a group session. For example, a group session is often configured to prevent members in different locations from changing the volume. Similarly, a group session can be configured to only allow a single host, or sometimes one or more administrator members, to change the volume for the group session.

In some embodiments, volume commands are handled differently because the volume commands do not necessarily require modifying the session state. In these examples a volume command modifies an audio output setting on one or more connected devices. Accordingly, the command is propagated to one or more target devices but does not update the session state. Typically, the session control service 302 is used to determine which devices are target devices based on the configuration of the group session.

In this example, the participant account device 542 sends a volume command to the connect service 314. The connect service sends the command to the host management service 306 which validates the command with the session control service 302. The host management service 306 sends the volume command to the administrator account device 402. In other examples, it may send the command to multiple devices. The administrator account device 402 updates the volume based on the command. In some examples, the administrator account device 402 updates other active devices belonging to the administrator account cluster using the connect service 314. Once the volume is updated, the host management service 306 propagates the new volume value to all active member devices via the connect service 314.

As used herein, the term "engine" is applied to describe a specific structure for performing specific associated functions, such as a special purpose computer as programmed to perform algorithms (e.g., processes) disclosed herein. The engine can take any of a variety of structural forms, including: instructions executable to perform algorithms to achieve a desired result, one or more processors (e.g., virtual or physical processors) executing instructions to perform algorithms to achieve a desired result, or one or more devices operating to perform algorithms to achieve a desired result.

Where data structures are referred to, the data structure can be stored on dedicated or shared computer-readable mediums, such as volatile memory, non-volatile, transitory, or non-transitory memory.

The various examples and teachings described above are provided by way of illustration only and should not be construed to limit the scope of the present disclosure. Those skilled in the art will readily recognize various modifications and changes that may be made without following the examples and applications illustrated and described herein, and without departing from the true spirit and scope of the present disclosure.

What is claimed is:

1. A method of simultaneously playing recorded media content on a plurality of media playback devices for a group session, the plurality of media playback devices comprising an administrator media playback device and a plurality of participant media playback devices, the method comprising:
    sending a create group session request from the administrator media playback device to a cloud host server;
    storing session state data for the group session at the cloud host server, the session state data including a media content identifier for a recorded media content item of the group session and information for determining a current playback time position of the recorded media content item;
    storing a list of members of the group session at the cloud host server;
    determining, at the cloud host server, active media playback devices from the plurality of media playback devices for the list of members of the group session;
    generating and sending a session state data package, including at least some of the session state data, from the cloud host server to the active media playback devices, wherein the session state data package is usable by each of the active media playback devices to synchronize playback of the recorded media content item of the group session at the current playback time position; and
    setting, via the administrator media playback device, different levels of control over the recorded media content for the plurality of participant media playback devices.

2. The method of claim 1, further comprising:
    streaming and playing the media content item from the cloud host server at each of the active media playback devices based on the session state data package.

3. The method of claim 1, wherein the session state data further comprises a queue of media content items to be played in the group session.

4. The method of claim 3, wherein the queue of media content items comprises, in order:
    the media content item as a currently playing media content item;
    a dummy media content item; and
    a plurality of other media content items to be played in the group session.

5. The method of claim 3, further comprising:
    scheduling, by the cloud host server, a time at which the playback of the media content item is scheduled to end;
    at the scheduled time, updating, by the cloud host server, the session state data package to skip to a next media content item in the queue; and
    generating and sending an updated state data package to the active media playback devices to play the next media content item in the queue of the group session.

6. The method of claim 1, wherein the group session is created by:
    receiving a request to create the group session from a device;
    creating the group session including storing a group session ID; and
    storing a member associated with the device as an administrator of the group session in the list of members.

7. The method of claim 1, wherein a new member is added to the group session by:
    receiving a request to join the group session from a device;
    adding the new member associated with the device to the list of members; and
    sending the session state data package to one or more determined active media playback devices of the new member.

8. The method of claim 1, wherein the session state data is updated by:
    receiving a command from a device associated with a member in the list of members;
    validating that the member has permission to update the session state data with the command;
    updating the session state data based on the command; and
    generating and sending an updated session state data package to the active media playback devices, wherein the updated session state data package includes at least some of the updated session state data.

9. The method of claim 1, wherein a member is removed from the group session by:
    receiving a request to remove the member from the group session from a device; and
    removing the member from the list of members.

10. The method of claim 1, wherein each member is associated with a user account for a media content provider service.

11. The method of claim 1, the method further comprising:
    scheduling a callback with a timer service based on a duration of the media content item; and
    updating the session state data in response to receiving the callback from the timer service.

12. The method of claim 1, the method further comprising:
    scheduling a first callback with a timer service based on a duration of the media content item;
    receiving a command, from a device associated with a member in the list of members, selecting a second media content item;
    updating the session state data according to the command;
    canceling the first callback at the timer service;
    scheduling a second callback with the timer service based on the duration of the second media content item; and
    updating the session state data in response to receiving the second callback from the timer service.

13. The method of claim 1, wherein at least one member in the list of members is associated with two active media playback devices from the active media playback devices.

14. The method of claim 1, wherein setting the different levels of control comprises at least one of promoting a member to a host role and adding a member as an administrator.

15. A non-transitory computer-readable storage device storing data instructions for simultaneously playing recorded media content on a plurality of media playback devices for a group session, the plurality of media playback devices comprising an administrator media playback device and a plurality of participant media playback devices, the instructions, when executed by a processing device, cause the processing device to:

send a create group session request from the administrator media playback device;

store session state data for the group session, the session state data including a media content identifier for a recorded media content item of the group session and information for determining a current playback time position of the recorded media content item;

store a list of members of the group session;

determine active media playback devices from the plurality of media playback devices for the list of members of the group session;

generate and send a session state data package, including at least some of the session state data, to the active media playback devices, wherein the session state data package is usable by each of the active media playback devices to synchronize playback of the recorded media content item of the group session at the current playback time position; and set, via the administrator media playback device, different levels of control over the recorded media content for the plurality of participant media playback devices.

16. The non-transitory computer-readable storage device of claim 15, wherein the session state data package is further usable by the active media playback devices to:

stream and play the media content item from a server at each of the active media playback devices based on the session state data package.

17. The non-transitory computer-readable storage device of claim 15, wherein the session state data further comprises a queue of media content items to be played in the group session.

18. The non-transitory computer-readable storage device of claim 17, wherein the queue of media content items comprises, in order:

the media content item as a currently playing media content item;

a dummy media content item; and a plurality of other media content items to be played in the group session.

19. The non-transitory computer-readable storage device of claim 17, wherein the data instructions further cause the processing device to:

schedule a time at which the playback of the media content item is scheduled to end;

at the scheduled time, update the session state data package to skip to a next media content item in the queue; and generate and send an updated state data package to the active media playback devices to play the next media content item in the queue of the group session.

20. A system for simultaneously playing recorded media content on a plurality of media playback devices for a group session, the plurality of media playback devices comprising an administrator media playback device and a plurality of participant media playback devices, the system comprising:

at least one server having at least one processor and at least one memory storing instructions which when executed by the at least one processor cause the at least one server to:

send a create group session request from the administrator media playback device;

store session state data for the group session, the session state data including a media content identifier for a recorded media content item of the group session and information for determining a current playback time position of the recorded media content item;

store a list of members of the group session;

determine active media playback devices from the plurality of media playback devices for the list of members of the group session;

generate and send a session state data package, including at least some of the session state data, to the active media playback devices, wherein the session state data package is usable by each of the active media playback devices to synchronize playback of the recorded media content item of the group session at the current playback time position; and set, via the administrator media playback device, different levels of control over the recorded media content for the plurality of participant media playback devices.

21. The system of claim 20, wherein the instructions further cause the at least one server to:

schedule a first callback with a timer service based on a duration of the media content item;

receive a command, from a device associated with a member in the list of members, selecting a second media content item;

update the session state data according to the command;

cancel the first callback at the timer service;

schedule a second callback with the timer service based on the duration of the second media content item; and update the session state data in response to receiving the second callback from the timer service.

\* \* \* \* \*